United States Patent
Huang

(10) Patent No.: US 7,801,524 B2
(45) Date of Patent: Sep. 21, 2010

(54) COMMUNICATION APPARATUS AND SIGNALING SYSTEM THEREOF

(75) Inventor: Hung-Chi Huang, Taipei (TW)

(73) Assignee: Compal Communications, Inc., Neihu, Taipei (TW)

( * ) Notice: Subject to any disclaimer, the term of this patent is extended or adjusted under 35 U.S.C. 154(b) by 649 days.

(21) Appl. No.: 11/878,732

(22) Filed: Jul. 26, 2007

(65) Prior Publication Data

US 2008/0026737 A1 Jan. 31, 2008

(30) Foreign Application Priority Data

Jul. 26, 2006 (TW) .............................. 95213107 U

(51) Int. Cl.
*H04W 4/00* (2009.01)
(52) U.S. Cl. ................. 455/432.3; 455/403; 455/414.1; 455/550.1
(58) Field of Classification Search ............... 455/403, 455/404.1, 404.2, 412.1, 414.1, 414.2, 450, 455/432.1, 406, 410, 411, 432.3, 550.1
See application file for complete search history.

(56) References Cited

U.S. PATENT DOCUMENTS 6,192,041 B1 * 2/2001 Phillips ...................... 370/338
2007/0167166 A1 * 7/2007 Fleischer et al. ............ 455/440

* cited by examiner

*Primary Examiner*—Jean A Gelin
(74) *Attorney, Agent, or Firm*—Winston Hsu

(57) ABSTRACT

The invention provides a communication apparatus which includes a look-up table, a receiving/transmitting module, and a processing module. The processing module is electrically connected to the look-up table and the receiving/transmitting module respectively. The look-up table stores a plurality of controlling messages and first phone numbers. Each controlling message corresponds to one of the first phone numbers. The receiving/transmitting module receives an incoming call including a second phone number. The processing module determines if the second phone number matches one of the first phone numbers, and if yes, the processing module generates information on the basis of the controlling message corresponding to the matched first phone number, and according to the second phone number, transmits the information through the receiving/transmitting module.

5 Claims, 3 Drawing Sheets

| first phone number | control message |
|---|---|
| 0935080912 | transmit a specific message |
| • • • • | • • • • |
| 0947320917 | ring and show a message "dial to 935080912" |
| 0920256128 | transmit current position information |

| first phone number | control message |
|---|---|
| 0935080912 | transmit a specific message |
| ⋮ | ⋮ |
| 0947320917 | ring and show a message "dial to 935080912" |
| 0920256128 | transmit current position information |

| first phone number | first control message |
|---|---|
| 0935080800 | stock price inquiry |
| 0935080801 | air temperature inquiry |
| ⋮ | ⋮ |
| 0935080810 | exchange rate inquiry |
| 0935080811 | re-transmission request |
| 0935080900 | (decimal point) . |
| 0935080901 | (number) 1 |
| 0935080902 | (number) 2 |
| ⋮ | ⋮ |
| 0935080910 | (number) 0 |

FIG. 2C

| first phone number | second control message |
|---|---|
| 0935080800 | stock price reply |
| 0935080801 | air temperature reply |
| ⋮ | ⋮ |
| 0935080810 | exchange rate reply |
| 0935080811 | re-transmission request |
| 0935080900 | (decimal point) . |
| 0935080901 | (number) 1 |
| 0935080902 | (number) 2 |
| ⋮ | ⋮ |
| 0935080910 | (number) 0 |

FIG. 2D

COMMUNICATION APPARATUS AND SIGNALING SYSTEM THEREOF

BACKGROUND OF THE INVENTION

1. Field of the Invention

The invention relates to a communication apparatus and a signaling system thereof, and particularly to a communication apparatus and a signaling system thereof utilizing a phone number of an incoming call.

2. Description of the Prior Art

A general mobile communication provides, except for a general communication service, a non-communication service such as a weather inquiry, a stock price inquiry, an exchange rate inquiry, or the like. However, these non-communication services are based on either communication service or communication hardware. The former is built up on communication protocols free from hardware, and the non-communication service is provided after establishing a communication and represented in a form of voice or customer service. The latter is built up on a hardware communication format, and the non-communication service is provided by a system provider. In this case, a specific mark defined by the system provider can be regarded as a service request. For example, a remaining quota can be inquired by dialing 234 on a cellular phone, or a service request can be transmitted to the system provider by a menu instead of dialing by a user himself.

However, the aforesaid communication services both utilize an additional message other than messages for establishing a communication to be a signal for a service. For example, the former generates a signal by pressing keys or voicing after establishing a communication, while the latter utilizes specific marks defined by the system provider to generate a signal. If the message for establishing a communication can be regarded as a signal, any receiver can define its own response, such that the communication service can be diversified.

Therefore, the scope of the invention is to provide a communication apparatus and a signaling system thereof utilizing a phone number of an incoming call, such that the communication service can be diversified.

SUMMARY OF THE INVENTION

A scope of the invention is to provide a communication apparatus and a signaling system thereof utilizing a phone number of an incoming call.

According to a preferred embodiment, the communication apparatus of the invention includes a look-up table, a receiving/transmitting module, and a processing module. The look-up table stores a plurality of control messages and a plurality of first phone numbers. Each of the control messages corresponds to one of the first phone numbers. The receiving/transmitting module receives an incoming call including a second phone number from a caller. The second phone number is the phone number of the caller. The processing module is electrically connected to the look-up table and the receiving/transmitting module respectively.

The processing module determines whether the second phone number matches one of the first phone numbers. If the result of the determination is yes, the processing module performs a function on the basis of the control message corresponding to the matched first phone number. Besides, the processing module hangs up the incoming call before the function is performed. In other words, the incoming call is hung up before a regular communication is established.

Additionally, the processing module performs the function to generate information and transmits the information through the receiving/transmitting module according to the second phone number. The information can be transmitted in a form of a short message.

The communication apparatus further includes a global positioning system (GPS) module. The GPS module is electrically connected to the processing module. The processing module triggers the GPS module to generate current location information associated with the communication apparatus as the information.

Therefore, the communication apparatus of the invention makes the different response according to the look-up table and the phone number of the incoming call, such that the communication service can be diversified.

The advantage and spirit of the invention may be understood by the following recitations together with the appended drawings.

BRIEF DESCRIPTION OF THE APPENDED DRAWINGS

FIG. 2C is a schematic diagram illustrating a part of the first look-up table shown in FIG. 2B.

FIG. 2D is a schematic diagram illustrating a part of the second look-up table shown in FIG. 2B.

DETAILED DESCRIPTION OF THE INVENTION

Figures 1A, 1B:
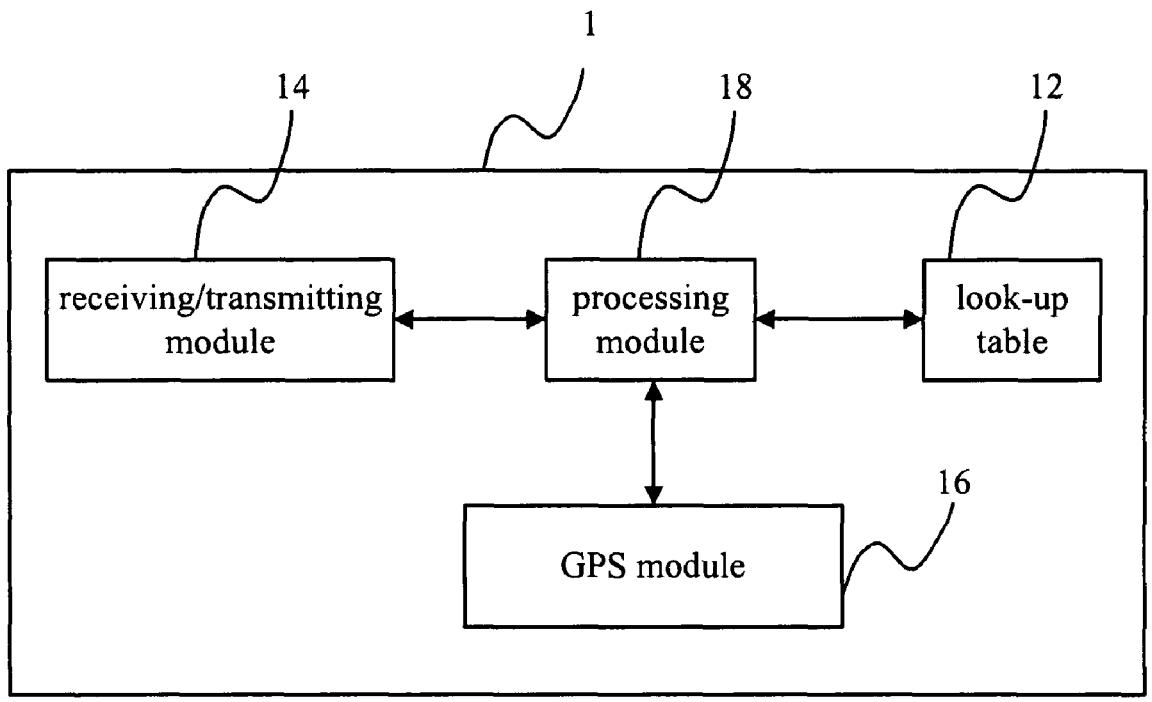
FIG. 1A is a functional block diagram of a communication apparatus according to a first preferred embodiment of the invention.
FIG. 1B is a schematic diagram illustrating a part of the look-up table shown in FIG. 1A.

Please refer to FIG. 1A and FIG. 1B. FIG. 1A is a functional block diagram of a communication apparatus 1 according to a first preferred embodiment of the invention. FIG. 1B is a schematic diagram illustrating a part of a look-up table 12 shown in FIG. 1A. According to the first embodiment, the communication apparatus 1 of the invention includes the look up table 12, a receiving/transmitting module 14, a GPS module 16, and a processing module 18. The look-up table 12 stores a plurality of control messages and a plurality of first phone numbers. Each of the control messages corresponds to one of the first phone numbers. The receiving/transmitting module 14 receives an incoming call including a second phone number from a caller. The second phone number is a phone number of the caller. The processing module 18 is electrically connected to the look-up table 12, the receiving/transmitting module 14, and the GPS module 16 respectively.

The processing module 18 determines whether the second phone number matches one of the first phone numbers. If the result of the determination is yes, the processing module 18 performs a function on the basis of the control message corresponding to the matched first phone number. The processing module 18 hangs up the incoming call before the function is performed. That is, the incoming call is hung up before a regular communication is established. Additionally, the processing module 18 performs the function to generate information and transmits the information through the receiving/transmitting module 14 according to the second phone number. The information can be transmitted in a form of a short message. The processing module 18 triggers the GPS module 16 to generate current location information associated with the communication apparatus 1 as the information.

Please refer to FIG. 1B. In an application of the first preferred embodiment, the second phone number is 09305080912 for example. The processing module 18 transmits a specific message on the basis of the control message corresponding to 09305080912. The specific message is pre-edited before it is transmitted. In another application of the first preferred embodiment, the second phone number is 0920256128 for example. The processing module 18 triggers the GPS module 16 on the basis of the control message corresponding to 0920256128 to generate current location information associated with the communication apparatus 1 as the information.

Figure 2A:
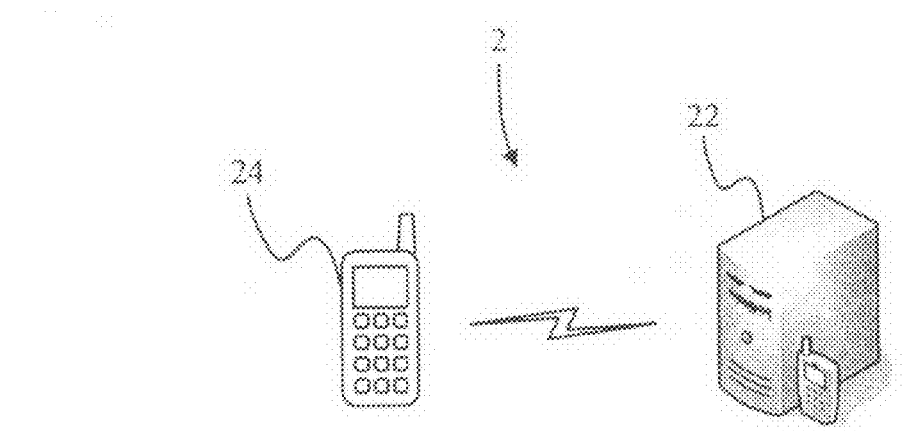
FIG. 2A is a schematic diagram illustrating a signaling system according to a second preferred embodiment of the invention.
Figure 2B:
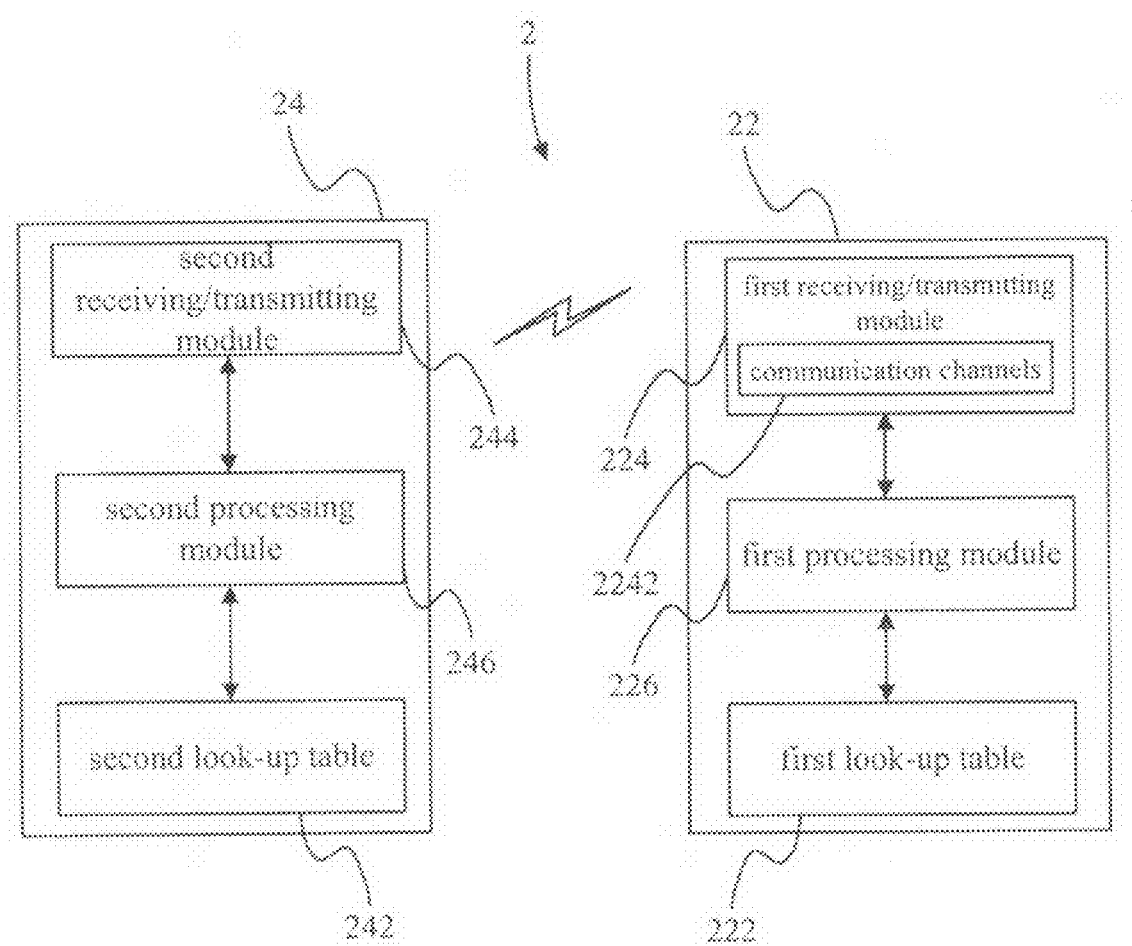
FIG. 2B is a functional block diagram of the signaling system shown in FIG. 2A.

Please refer to FIG. 2A. FIG. 2A is a schematic diagram illustrating a signaling system 2 according to a second preferred embodiment of the invention. FIG. 2B is a functional block diagram of the signaling system 2 shown in FIG. 2A. The signaling system 2 of the invention includes a service server 22 and a communication apparatus 24. The service server 22 and the communication apparatus 24 communicate with each other in wireless. The service server 22 includes a first look-up table 222, a first receiving/transmitting module 224, and a first processing module 226. The first processing module 226 is electrically connected to the first receiving/transmitting 224 and the first look-up table 222 respectively. The first receiving/transmitting module 224 may utilize a plurality of communication channels 2242. The communication apparatus 24 includes a second look-up table 242, a second receiving/transmitting module 244, and a second processing module 246. The second processing module 246 is electrically connected to the second receiving/transmitting 244 and the second look-up table 242 respectively.

Please refer to FIG. 2C and FIG. 2D. FIG. 2C is a schematic diagram illustrating a part of the first look-up table 222 shown in FIG. 2B. FIG. 2D is a schematic diagram illustrating a part of the second look-up table 242 shown in FIG. 2B. The first look-up table 222 stores a plurality of first control messages and a plurality of first phone numbers. Each of the first control messages corresponds to one of the first phone numbers. Each of communication channels 2242 corresponds to one of the first phone numbers. The second look-up table 242 stores a plurality of second control messages and the first phone numbers. Each of the second control messages corresponds to one of the first phone numbers.

When the communication apparatus 24 sequentially dials, in response to a request, N requested first phone numbers to the service server 22, the first receiving/transmitting module 226 of the service server 22 receives N first incoming calls through the corresponding channels 2242, wherein N is a natural number. Each of the first incoming calls includes a second phone number and one of the N requested first phone numbers, and the first processing module 226 collects the N requested first phone numbers. Then, the first processing module 226 accesses N requested first control messages form the first look-up table 222 according to the N requested first phone numbers. The first processing module 226 then performs a function to generate information on the basis of the N requested first control messages and transmits the information to the communication apparatus 24 through the first receiving/transmitting module 226 through the corresponding channels 2242 according to the second phone number.

The N first incoming calls contain the same second phone number. In other words, the N first incoming calls come from the same caller. If the N first incoming calls contain different second phone numbers, the N first incoming calls are divided into several groups according to the respective second phone number, and each group has a different response. The first processing module 226 hangs up the N first incoming calls before a regular communication is established; that is, the service server 22 does not establish a regular communication with the communication apparatus 24.

The first processing module 226 determines M first phone numbers according to the information and dials the second phone number to the communication apparatus 24 through the corresponding channel 2242 according to the M determined first phone numbers, wherein M is a natural number. The second receiving/transmitting module 244 receives M second incoming calls from the service server 22, and each of the second incoming calls includes one of the M determined first phone numbers. The second processing module 246 collects the M determined first phone numbers received from the second receiving/transmitting module 244. The second processing module 246 accesses M determined second control messages from the second look-up table 242 according to the M determined first phone numbers. The second processing module 246 processes the M determined second control messages to obtain the information. Additionally, the second processing module 246 hangs up the M second incoming calls before a regular communication is established, in other words, the communication apparatus 24 does not establish a regular communication with the service server 22.

Please refer to FIG. 2C. In an application of the second preferred embodiment, the service server 22 receives five incoming calls from the communication apparatus 24 respectively through five communication channels of the communication channels 2242. The communication apparatus 24 has a second phone number, 0927420168. The first phone numbers respectively corresponding to the five communication channels are 0935080800, 0935080901, 0935080902, 0935080904, and 0935080905. The first processing module 226 determines five first control messages according to the first look-up table 222 and interprets the request, that is, the price inquiry about a stock numbered 1245. The first processing module 226 performs a function of the stock price inquiry according to the five first control messages and generates the stock price information. If the stock price is 102.5, the first processing module 226 determines six first phone numbers to be 0935080800, 0935080901, 0935080910, 0935080902, 0935080900, and 0935080905 and sequentially dials the six determined first phone numbers to 0927420168 through the corresponding channels.

Please refer to FIG. 2D. The second receiving/transmitting module 244 of the communication apparatus 24 sequentially receives six incoming calls dialed from the service server 22. The second receiving/transmitting module 244 determines six second control messages according to the six determined first phone numbers and the second look-up table 242 and interprets the stock price information. The six second control messages are "stock price reply", "1", "0", "2", ".", and "5", that is, "the stock price is 102.5".

In an embodiment, compared with the second preferred embodiment, the service server transmits the determined information in a form of a short message to the communication apparatus requesting the request.

It should be noticed that, the invention is not limited in the aforesaid embodiments. Although the aforesaid embodiments show a mode of single inquiry-and-reply, the invention can be applied to an interaction mode in a more complex application. Further, the communication apparatus of the invention can offer more services by designing the look-up table. For example, the response of the service server can be determined in an inquiry-and-reply method, and the final response is not determined just on the basis of a single input. Additionally, the signaling system of the invention transmits a time event message to the service server. When the time is up, the service server responses a specific message, such as raising an alarm, to the caller. Actually, the response might be triggered by another event. Therefore, the spirit of the invention may be more elaborate with suitable software incorporated.

Compared with prior art, the communication apparatus makes a different response according to the look-up table and the phone number of an incoming call. Additionally, because the communication apparatus utilizes the phone number of the incoming call as a signal, the communication apparatus is not charged with the cost for establishing a regular communication. Furthermore, the receiver can itself define a look-up table to fit its requirement, or multiple users can design their own look-up tables compatibly with each other to generate more complex services, so as to achieve the purpose of the diversification communication.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A signaling system, comprising:
   a communication apparatus; and
   a service server, comprising:
   a first look-up table storing a plurality of first control messages and a plurality of first phone numbers, each of the first control messages corresponding to one of the first phone numbers;
   a first receiving/transmitting module comprising a plurality of communication channels, each of the communication channels corresponding to one of the first phone numbers, wherein the communication apparatus sequentially dials, in response to a request, N requested first phone numbers to the service server, and then the first receiving/transmitting module receives N first incoming calls through the corresponding channels, each of the first incoming calls comprises a second phone number and one of the N requested first phone numbers, wherein N is a natural number; and
   a first processing module electrically connected to the first receiving/transmitting module and the first look-up table respectively, the first processing module collecting the N requested first phone numbers received by the first receiving/transmitting module, accessing N requested first control messages from the first look-up table according to the N requested first phone numbers, performing a function on the basis of the N requested first control messages to generate information, and transmitting, according to the second phone number, the information through the receiving/transmitting module to the communication apparatus.

2. The signaling system of claim 1, wherein the first processing module transmits the information in a form of a short message.

3. The signaling system of claim 1, wherein the first processing module hangs up the N first incoming calls.

4. The signaling system of claim 1, wherein the first processing module determines, according to the information, M first phone numbers, and dials, according to the M determined first phone numbers, the second phone number to the communication apparatus through the corresponding channels, wherein M is a natural number, and the communication apparatus comprises:
   a second look-up table storing a plurality of second control messages and the first phone numbers, each of the second control messages corresponding to one the first phone numbers;
   a second receiving/transmitting module receiving M second incoming calls from the service server, each of the second incoming calls comprising one of the M determined first phone numbers; and
   a second processing module electrically connected to the second receiving/transmitting module and the second look-up table respectively, the second processing module collecting the M determined first phone numbers received by the second receiving/transmitting module, accessing M determined second control messages from the second look-up table according to the M determined first phone numbers, and processing the M determined second control messages to obtain the information.

5. The signaling system of claim 4, wherein the second processing module hangs up the M second incoming calls.

* * * * *